US009081145B2

(12) United States Patent
Park et al.

(10) Patent No.: US 9,081,145 B2
(45) Date of Patent: Jul. 14, 2015

(54) POLARIZING PLATE AND OPTICAL DISPLAY DEVICE INCLUDING THE SAME

(71) Applicants: Eun Su Park, Uiwang-si (KR); Kwang Ho Shin, Uiwang-si (KR); Dong Yoon Shin, Uiwang-si (KR); Eun Kyeong Seo, Uiwang-si (KR); Hae Ryong Chung, Uiwang-si (KR)

(72) Inventors: Eun Su Park, Uiwang-si (KR); Kwang Ho Shin, Uiwang-si (KR); Dong Yoon Shin, Uiwang-si (KR); Eun Kyeong Seo, Uiwang-si (KR); Hae Ryong Chung, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 226 days.

(21) Appl. No.: 13/713,284

(22) Filed: Dec. 13, 2012

(65) Prior Publication Data
US 2013/0170033 A1 Jul. 4, 2013

(30) Foreign Application Priority Data
Dec. 30, 2011 (KR) .......................... 10-2011-0147631

(51) Int. Cl.
*G02B 5/30* (2006.01)
(52) U.S. Cl.
CPC .................................... *G02B 5/3025* (2013.01)
(58) Field of Classification Search
CPC ..................................................... G02B 5/3025
USPC ........................................................ 359/483.01
See application file for complete search history.

(56) References Cited

U.S. PATENT DOCUMENTS

| 7,138,187 B2 * | 11/2006 | Breton et al. ................. 428/522 |
| 7,494,611 B2 * | 2/2009 | Shimizu et al. ............... 264/216 |
| 7,980,679 B2 * | 7/2011 | Seto et al. ........................ 347/68 |
| 2002/0154406 A1 * | 10/2002 | Merrill et al. ................. 359/498 |

FOREIGN PATENT DOCUMENTS

| CN | 101023122 A | | 8/2007 |
| JP | 2006-265288 A | | 10/2006 |
| JP | 2006-265288 A | | 10/2006 |
| JP | 2010096918 A | * | 4/2010 |
| KR | 10-2007-0028482 A | | 3/2007 |
| TW | 200706366 A | | 2/2007 |
| TW | I310042 B | | 5/2009 |

OTHER PUBLICATIONS

Office Action mailed Sep. 26, 2014 in corresponding Taiwanese Patent Application No. 101149609.
Office Action mailed Aug. 26, 2014 in corresponding Chinese Patent Application No. 201210585331.7.

* cited by examiner

*Primary Examiner* — Frank Font
(74) *Attorney, Agent, or Firm* — Lee & Morse, P.C.

(57) ABSTRACT

A polarizing plate includes a polarizer, a first protective film attached to one side of the polarizer, and a second protective film attached to another side of the polarizer. A ratio between coefficients of thermal expansion of the first and second protective films, measured in a transverse direction (TD) at a temperature from about 25° C. to about 120° C., ranges from about 0.5 to about 2. A ratio between coefficients of thermal expansion of the first and second protective films measured in a machine direction (MD) at a temperature from about 25° C. to about 120° C. ranges from about 0.5 to about 2.

10 Claims, 1 Drawing Sheet

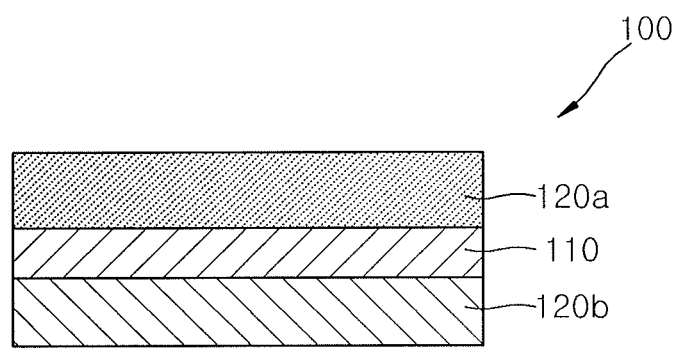

POLARIZING PLATE AND OPTICAL DISPLAY DEVICE INCLUDING THE SAME

CROSS-REFERENCE TO RELATED APPLICATION

The present application claims priority under 35 U.S.C. §119 to Korean Patent Application No. 10-2011-0147631 filed on Dec. 30, 2011, in the Korean Intellectual Property Office, and entitled: "POLARIZING PLATE AND OPTICAL DISPLAY DEVICE INCLUDING THE SAME," which is incorporated by reference herein in its entirety.

BACKGROUND

1. Field

Embodiments relate to a polarizing plate and an optical display device including the same.

2. Description of the Related Art

A polarizing plate generally includes a polarizer having a polarizing function and a protective film which is attached to one or both sides of the polarizer to protect the polarizer. According to types of optical display devices to which the polarizing plate is mounted, a retardation compensation film, a bonding layer, an adhesive layer, a surface treatment layer, and the like may be additionally stacked on the protective film of the polarizing plate.

Polarizing plates may be manufactured in the form of semi-finished products rather than as complete products. The polarizing plate may be attached to a liquid crystal cell via a pressure-sensitive adhesive, thereby providing a finished optical display device.

SUMMARY

Embodiments are directed to a polarizing plate including a polarizer, a first protective film attached to one side of the polarizer, and a second protective film attached to another side of the polarizer. A ratio $t2/t1$ or $t1/t2$ between coefficients $t1$ and $t2$ of thermal expansion of the first protective film and the second protective film ranges from about 0.5 to about 2, where $t1$ is a coefficient of thermal expansion of the first protective film and $t2$ is a coefficient of thermal expansion of the second protective film as measured in a transverse direction (TD) at a temperature from about 25° C. to about 120° C. A ratio $m2/m1$ or $m1/m2$ between coefficients $m1$ and $m2$ of thermal expansion of the first protective film and the second protective film ranges from about 0.5 to about 2, where $m1$ is a coefficient of thermal expansion of the first protective film and $m2$ is a coefficient of thermal expansion of the second protective film as measured in a machine direction (MD) at a temperature from about 25° C. to about 120° C.

The coefficients of thermal expansion of the first protective film and second protective film as measured in the transverse direction (TD) at a temperature from about 25° C. to about 120° C. may each range from about 0.01 ppm/° C. to about 0.04 ppm/° C.

The coefficients of thermal expansion of the first protective film and the second protective film, as measured in the machine direction (MD) at a temperature from about 25° C. to about 120° C., may each range from about 0.02 ppm/° C. to about 0.04 ppm/° C.

A ratio T/M between T and M may range between greater than about 0.5 to less than about 1.0, or from more than about 1.0 to less than about 1.5, where T is a value of greater than 1 in the ratio of the coefficient of thermal expansion of the first protective film and the coefficient of thermal expansion of the second protective film as measured in the transverse direction (TD) at a temperature from about 25° C. to about 120° C., and M is a value of greater than 1 in the ratio of the coefficients of thermal expansion of the first protective film and the second protective film as measured in the machine direction (MD) at a temperature from about 25° C. to about 120° C.

The first and second protective films may independently be made of at least one material selected from the group of cellulose, polyester, cyclic olefin polymer, polycarbonate, polyether sulfone, polysulfone, polyamide, polyimide, polyolefin, polyarylate, polyvinyl alcohol, polyvinyl chloride, and polyvinylidene chloride.

The first protective film may be a triacetylcellulose (TAC) film, and the second protective film is a polyethylene terephthalate (PET) film or a cyclic olefin polymer (COP) film.

The first protective film and the second protective film may each be a polyethylene terephthalate (PET) film.

The first protective film and the second protective film may each have a thickness of about 10 μm to about 100 μm.

The first protective film may be made of a different material from the second protective film.

An optical display device may include the polarizing plate.

BRIEF DESCRIPTION OF THE DRAWINGS

Features will become apparent to those of ordinary skill in the art by describing in detail exemplary embodiments with reference to the attached drawings in which:

FIG. 1 illustrates a cross-sectional view of a polarizing plate according to an embodiment.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing FIGURE, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

According to an embodiment, a polarizing plate may include a polarizer, a first protective film attached to one side of the polarizer; and a second protective film attached to the other side of the polarizer.

FIG. 1 illustrates a polarizing plate according to the embodiment. Referring to FIG. 1, the polarizing plate 100 may include a polarizer 110, a first protective film 120a attached to an upper side of the polarizer 110, and a second protective film 120b attached to a lower side of the polarizer 110.

Assuming $t1$ is a coefficient of thermal expansion of the first protective film and $t2$ is a coefficient of thermal expansion of the second protective film as measured in a transverse direction (TD, width direction of the protective film) at a temperature from about 25° C. to about 120° C., a ratio between coefficients t1 and t2 of thermal expansion may range from about 0.5 to about 2. If the ratio is less than 0.5 or more than 2, severe curling may occur on the polarizing plate, thereby causing defects, such as detachment and bubble-formation, edge lifting, and the like in the course of stacking on a panel.

As used herein, the ratio between coefficients of thermal expansion in the transverse direction may be defined as t2/t1 or t1/t2.

In an implementation, when t2>t1, the ratio may be defined as t2/t1, and when t1>t2, the ratio may be defined as t1/t2. In either case, the ratio may range from about 1.1 to about 1.8.

Assuming m1 is a coefficient of thermal expansion of the first protective film and m2 is a coefficient of thermal expansion of the second protective film as measured in a machine direction (MD, longitudinal direction of the protective film) at a temperature from about 25° C. to about 120° C., a ratio between coefficients m1 and m2 of thermal expansion may range from about 0.5 to about 2. If the ratio is less than 0.5 or more than 2, severe curling may occur on the polarizing plate, thereby causing defects, such as detachment and bubble-formation, edge lifting, and the like in the course of stacking on a panel.

As used herein, the ratio between coefficients of thermal expansion in the machine direction may be defined as m1/m2 or m2/m1.

In an implementation, when m2>m1, the ratio may be defined as m2/m1, and when m1>m2, the ratio may be defined as m1/m2. In either case, the ratio may range from about 1.1 to about 1.8.

The coefficients of thermal expansion of the first and second protective films may be measured by a suitable method. For example, the coefficient of thermal expansion can be calculated through thermomechanical analysis (TMA) by measuring a change in length of a protective film while the protective film is heated from about 25° C. to about 120° C. at a temperature increasing rate of 5° C./min, and calculating a ratio of a maximum change in length of the film to an initial length of the film.

The coefficients m1 and m2 of thermal expansion of the first and second protection films as measured in the machine direction at a temperature from about 25° C. to about 120° C. may range from about 0.01 ppm/° C. to about 0.08 ppm/° C. Within this range, when attached to the polarizer, the protective films may provide protection to the polarizer even at a high temperature and may prevent the curling phenomenon. The coefficients of thermal expansion of the first and second protection films in the machine direction may range from about 0.02 ppm/° C. to about 0.04 ppm/° C., or, for example, from 0.022 ppm/° C. to about 0.037 ppm/° C.

The coefficients t1 and t2 of thermal expansion of the first and second protection films as measured in the transverse direction at a temperature from about 25° C. to about 120° C. may range from about 0.01 ppm/° C. to about 0.04 ppm/° C. Within this range, when attached to the polarizer, the protective films may provide protection to the polarizer even at high temperature and may reduce or prevent curling. The coefficients of thermal expansion of the first and second protection films in the transverse direction may range from about 0.01 ppm/° C. to about 0.025 ppm/° C., or, for example, from 0.012 ppm/° C. to about 0.021 ppm/° C.

Assuming T is a value of more than 1 in the ratio of the coefficients of thermal expansion of the first and second protective films as measured in the transverse direction (TD) at a temperature from about 25° C. to about 120° C., and M is a value of more than 1 in the ratio of the coefficients of thermal expansion of the first and second protective films as measured in the machine direction (MD) at a temperature from about 25° C. to about 120° C., a ratio of T/M may range from about 0.5 or more to less than about 1.0, or from more than about 1.0 to less than about 1.5. Within this range, curling due to difference in the coefficients of thermal expansion of the protective films may be lessened due to an offset between the coefficients of thermal expansion in MD and TD. For example, the ratio may range from about 0.5 to about 0.99, or from about 1.01 to about 1.30.

The first and second protective films may have a thickness of about 10 µm to about 100 µm.

Any suitable films may be used as the first and second protective films of the polarizing plate as long as the films satisfy the aforementioned ranges of ratios of the coefficients of thermal expansion.

The first and second protective films may independently be formed of at least one selected from the group of cellulose, polyester, cyclic olefin polymer, polycarbonate, polyether sulfone, polysulfone, polyamide, polyimide, polyolefin, polyarylate, polyvinyl alcohol, polyvinyl chloride, polyvinylidene chloride, and mixtures thereof. The first and second protective films may be formed of different materials.

In one implementation, the first protective film may be a triacetylcellulose (TAC) film, and the second protective film may be a polyethylene terephthalate (PET) film or a cyclic olefin polymer (COP) film.

In another implementation, the first and second protective films may both be a polyethylene terephthalate (PET) film.

The protective films may be surface-treated protective films. Surface treatment such as an anti-reflection process, an anti-glare process, a glare reduction process, and a hard coating process may be performed to provide functionality to the protective films.

The polarizer is a film that aligns directions of light passing through a retardation film such that an incident beam is decomposed into two polarizing components that are orthogonal to each other so that only one of the components is allowed to pass therethrough and the other component is absorbed or scattered.

Herein, any suitable polarizer typically used in manufacture of a polarizing plate may be used. For example, the polarizer may be manufactured by dyeing a polyvinyl alcohol film with iodine or a dichroic dye, followed by stretching the dyed polyvinyl alcohol film in a certain direction. Specifically, the polarizer may be manufactured by swelling, dyeing, stretching, and cross-linking.

The polarizer may have a thickness from about 20 µm to about 100 µm, as an example.

The protective films may be attached to the polarizer via a suitable method, for example, via an adhesive layer. The adhesive layer may be formed using typical adhesives, such as a water-based adhesive or a pressure-sensitive adhesive.

The polarizing plate may include a retardation film, a bonding layer, and an adhesive layer according to an application thereof.

The retardation film may have a function of regulating a phase-difference or improving a viewing angle by regulating optical characteristics of light passing through a liquid crystal display panel. The retardation film may be a λ/4 retardation film and may change circular polarized light into linear polarized light or vice versa by inducing a phase difference of λ/4 between two polarized components that are parallel to an optical axis of the retardation film and orthogonal to each other. For example, the retardation film may change circular polarized light emitted from an organic light-emitting display into linear polarized light or vice versa Depending on the material of the protective films, the retardation compensation film may have a phase difference of about 0 to about 50 for a typical TAC film. If the protective films are formed of a different material, the phase difference may vary to a great degree.

A suitable retardation film may be used so long as it provides a function of compensating for the phase difference. The retardation film may be at least one film selected from the group of a cyclic olefin polymer (COP) film, an acrylic film, a cellulose film, a olefin film, and mixtures thereof. For example, the retardation compensation film may be a cyclic olefin polymer film.

The retardation film may have a thickness from about 10 μm to about 100 μm. Within this range, the retardation film may provide an optical compensation effect to the polarizing plate. Particularly, optical interference or a moiré or rainbow phenomenon on the surface of the polarizing plate may be reduced or relieved. The retardation compensation film may have a thickness from about 10 μm to about 40 μm, as an example.

Embodiments also provide an optical display device that includes the polarizing plate described herein. The optical display device may include an organic light emitting diode display or a liquid crystal display, as examples. The polarizing plate may be attached to one or both of upper and lower sides of the optical display device.

EXAMPLES AND COMPARATIVE EXAMPLES

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further it is to be understood that the embodiments are not limited to the particular details described in the Examples and Comparative Examples.

Specifications of the components used in examples and comparative examples were as follows.

(A) Polarizer: Polyvinyl alcohol film (VF-PS6000, Kuraray Co., Ltd., thickness: 60 μm)

(B) Protective film:

(B1) protective film 1 (Fuji TAC, TAC, Fuji Co., Ltd., thickness: 80 μm);

(B2) protective film 2 (Konica TAC, TAC, Konica Co., Ltd., thickness: 40 μm);

(B-3) protective film 3 (TA-016, PET, Toyobo Co., Ltd., thickness: 100 μm);

(B-4) protective film 4 (PET, SKC Corporation, thickness: 75 μm)

The coefficients of thermal expansion of the protective films were calculated through thermomechanical analysis (TMA) by measuring a change in length of each of the protective films while the protective films were heated from about 25° C. to about 120° C. at a temperature increasing rate of 5° C./min, and calculating a ratio of a maximum change in length (or maximum change of dimension) of the film to an initial length of each of the films. Results are shown in Table 1 below.

TABLE 1

| | Coefficients of thermal expansion in MD (ppm/° C.) | Coefficients of thermal expansion in TD (ppm/° C.) |
| --- | --- | --- |
| Protective film 1 | 0.024 | 0.072 |
| Protective film 2 | 0.037 | 0.012 |
| Protective film 3 | 0.022 | 0.021 |
| Protective film 4 | 0.026 | 0.014 |

A polarizer was manufactured through dyeing, stretching and the like. Specifically, a polyvinyl alcohol film was stretched to two times an initial length at 150° C., followed by being adsorbed with iodine. Then, the iodine-adsorbed film was additionally stretched to 2.5 times the former elongation thereof in an aqueous boric acid solution at 40° C., thereby preparing a polarizer. Then, protective films as shown in Table 2 were attached to both sides of the polarizer via an adhesive, thereby preparing a polarizing plate.

A curling phenomenon and a direction thereof of the polarizing plate were measured. Curling was evaluated with respect to the 100~300 μm thick polarizing plate having a size of 100 mm×100 mm, which was placed on the bottom, by measuring the greatest height among heights of respective corners of the polarizing plate from the bottom.

TABLE 2

| | Protective film | | Ratios of Coefficients of thermal expansion | | Curling Direction | Curling (mm) |
| --- | --- | --- | --- | --- | --- | --- |
| | Upper | Lower | MD | TD | | |
| Example 1 | Protective film 2 | Protective film 3 | 1.68 | 1.75 | TD | 11 |
| Example 2 | Protective film 2 | Protective film 4 | 1.42 | 1.16 | MD | 6 |
| Example 3 | Protective film 3 | Protective film 4 | 1.18 | 1.50 | TD | 8 |
| Comparative Example 1 | Protective film 1 | Protective film 2 | 1.54 | 6.00 | TD | 58 |
| Comparative Example 2 | Protective film 1 | Protective film 3 | 1.09 | 3.43 | TD | 38 |

As shown in Table 2, the polarizing plates which had ratios of coefficients of thermal expansion in MD and TD from 0.5 to 2 exhibited a low degree of curling. On the other hand, the polarizing plates of Comparative Examples 1 and 2, in which ratios of coefficients of thermal expansion of at least one of MD and TD were not within a range from 0.5 to 2, exhibited a high degree of curling.

By way of summation and review, if curling of a polarizing plate occurs during a process of attaching the polarizing plate to another surface, such as a liquid crystal cell, the attachment of the polarizing plate may not be efficiently performed. In addition, a curled polarizing plate may cause the generation of gas bubbles during attachment, or the curling may make it difficult to perform the attachment process itself.

Curling may be caused due to contraction of protective films attached to the upper and lower surfaces of the polarizing plate. Such a curling phenomenon may adversely affect the durability of the polarizing plate.

Curling of a polarizing plate may occur due to characteristics of the polarizing plate that is a biaxially oriented film, wherein a polymer oriented according to external environments tends to return to its original state over time. However, the polarizing plate attached to a substrate such as a liquid crystal cell may be essentially formed of a biaxially oriented film in order to obtain retardation characteristics. Thus, in order to prevent a curling phenomenon of a biaxially oriented polarizer, it is desirable to control the physical properties of a protective film attached to one or both sides of the polarizer.

Embodiments provide a polarizing plate, in which upper and lower protective films attached to a polarizer have a specific range of a ratio of coefficients of thermal expansion in a machine direction (MD) and a transverse direction (TD), thereby reducing or preventing curling of the polarizing plate. An optical display device may include polarizing plate.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A polarizing plate, comprising:
    a polarizer;
    a first protective film attached to one side of the polarizer; and
    a second protective film attached to another side of the polarizer,
    wherein:
    a ratio t2/t1 or t1/t2 between coefficients t1 and t2 of thermal expansion of the first protective film and the second protective film ranges from about 0.5 to about 2, where t1 is a coefficient of thermal expansion of the first protective film and t2 is a coefficient of thermal expansion of the second protective film as measured in a transverse direction (TD) at a temperature from about 25° C. to about 120° C., and
    wherein a ratio m2/m1 or m1/m2 between coefficients m1 and m2 of thermal expansion of the first protective film and the second protective film ranges from about 0.5 to about 2, where m1 is a coefficient of thermal expansion of the first protective film and m2 is a coefficient of thermal expansion of the second protective film as measured in a machine direction (MD) at a temperature from about 25° C. to about 120° C.

2. The polarizing plate as claimed in claim 1, wherein the coefficients of thermal expansion of the first protective film and second protective film as measured in the transverse direction (TD) at a temperature from about 25° C. to about 120° C. each range from about 0.01 ppm/° C. to about 0.04 ppm/° C.

3. The polarizing plate as claimed in claim 1, wherein the coefficients of thermal expansion of the first protective film and the second protective film, as measured in the machine direction (MD) at a temperature from about 25° C. to about 120° C., each range from about 0.02 ppm/° C. to about 0.04 ppm/° C.

4. The polarizing plate as claimed in claim 1, wherein a ratio T/M between T and M ranges between greater than about 0.5 to less than about 1.0, or from more than about 1.0 to less than about 1.5, where T is a value of greater than 1 in the ratio of the coefficient of thermal expansion of the first protective film and the coefficient of thermal expansion of the second protective film as measured in the transverse direction (TD) at a temperature from about 25° C. to about 120° C., and M is a value of greater than 1 in the ratio of the coefficients of thermal expansion of the first protective film and the second protective film as measured in the machine direction (MD) at a temperature from about 25° C. to about 120° C.

5. The polarizing plate as claimed in claim 1, wherein the first and second protective films are independently made of at least one material selected from the group of cellulose, polyester, cyclic olefin polymer, polycarbonate, polyether sulfone, polysulfone, polyamide, polyimide, polyolefin, polyarylate, polyvinyl alcohol, polyvinyl chloride, and polyvinylidene chloride.

6. The polarizing plate as claimed in claim 1, wherein the first protective film is a triacetylcellulose (TAC) film, and the second protective film is a polyethylene terephthalate (PET) film or a cyclic olefin polymer (COP) film.

7. The polarizing plate as claimed in claim 1, wherein the first protective film and the second protective film are each a polyethylene terephthalate (PET) film.

8. The polarizing plate as claimed in claim 1, wherein the first protective film and the second protective film each have a thickness of about 10 μm to about 100 μm.

9. The polarizing plate as claimed in claim 1, wherein the first protective film is made of a different material from the second protective film.

10. An optical display device, comprising the polarizing plate as claimed in claim 1.

* * * * *